(12) United States Patent
Honjo

(10) Patent No.: US 11,870,327 B2
(45) Date of Patent: Jan. 9, 2024

(54) VEHICLE DRIVE DEVICE

(71) Applicant: HONDA MOTOR CO., LTD., Tokyo (JP)

(72) Inventor: Takuya Honjo, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 184 days.

(21) Appl. No.: 17/559,508

(22) Filed: Dec. 22, 2021

(65) Prior Publication Data

US 2022/0224200 A1    Jul. 14, 2022

(30) Foreign Application Priority Data

Jan. 13, 2021  (JP) ................................. 2021-003823

(51) Int. Cl.
*H02K 9/19* (2006.01)
*H02K 5/04* (2006.01)
*H02K 5/22* (2006.01)

(52) U.S. Cl.
CPC ................. *H02K 9/19* (2013.01); *H02K 5/04* (2013.01); *H02K 5/225* (2013.01)

(58) Field of Classification Search
CPC ............ H02K 5/225; H02K 5/04; H02K 9/00; H02K 9/16; H02K 9/18; H02K 9/19; H02K 9/22
USPC ........................................ 310/71, 52, 54, 64
See application file for complete search history.

(56) References Cited

U.S. PATENT DOCUMENTS

| | | | |
|---|---|---|---|
| 6,201,365 B1 | 3/2001 | Hara et al. | |
| 6,323,613 B1 | 11/2001 | Hara et al. | |
| 9,260,007 B2* | 2/2016 | Sakaguchi | B60K 11/04 |
| 2016/0185232 A1* | 6/2016 | Suzuki | B60K 31/06 |
| | | | 903/945 |
| 2021/0234422 A1* | 7/2021 | Takeno | B60K 11/02 |
| 2023/0113748 A1* | 4/2023 | Inoue | H02K 3/50 |
| | | | 310/54 |

FOREIGN PATENT DOCUMENTS

JP    2001-238406 A    8/2001

* cited by examiner

*Primary Examiner* — Alexander A Singh
(74) *Attorney, Agent, or Firm* — Paratus Law Group, PLLC

(57) ABSTRACT

A vehicle drive device includes: a first electric machine; an electric machine housing accommodating the first electric machine; a live part that is provided inside the electric machine housing and is electrically connected to the first electric machine; and a temperature-control circuit for temperature control for the first electric machine. The temperature-control circuit includes: a first temperature-control circuit through which a non-conductive first temperature-control medium circulates; a second temperature-control circuit through which a conductive second temperature-control medium circulates; and a heat exchanger configured to exchange heat between the first temperature-control medium and the second temperature-control medium. A protection cover including a first protection wall is provided inside the electric machine housing.

7 Claims, 5 Drawing Sheets

VEHICLE DRIVE DEVICE

CROSS-REFERENCE TO RELATED APPLICATIONS

This application is based on and claims priority under 35 USC 119 from Japanese Patent Application No. 2021-003823, filed on Jan. 13, 2021, the contents of which are incorporated herein by reference.

TECHNICAL FIELD

The present invention relates to a vehicle drive device mounted on a vehicle and, more particularly, to a vehicle drive device including a temperature control circuit.

BACKGROUND ART

In the related art, there is a vehicle, such as an electric vehicle, on which a vehicle drive device including an electric machine is mounted. In general, since an electric machine generates heat when driven, a vehicle drive device includes a temperature control circuit configured to control a temperature of the electric machine. For example, JP2001-238406A discloses a vehicle drive device including: an electric motor M; and a temperature control circuit including a circulation path L for cooling the electric motor M.

The temperature control circuit included in that vehicle drive device includes: the circulation path L through which oil circulates for cooling the electric motor M; a circulation path F through which cooling water circulates for cooling an inverter U; and a heat exchange unit (oil cooler C) configured to exchange heat between the cooling water flowing through the circulation path F and the oil flowing through the circulation path L. A radiator R is provided in the circulation path F, and the cooling water flowing through the circulation path F is cooled by the radiator R. The oil flowing through the circulation path L is cooled by the heat transfer between the cooling water flowing through the circulation path F and the oil flowing through the circulation path L in the heat exchange unit (oil cooler C). Therefore, in that vehicle drive device, a radiator for cooling the oil is not necessary, and the cooling water flowing through the circulation path F and the oil flowing through the circulation path L can be cooled by one radiator, thereby miniaturizing the vehicle drive device.

In that vehicle drive device, when the heat exchange unit (oil cooler C) is damaged, the cooling water flowing through the circulation path F for cooling the inverter U may flow into the circulation path L and may enter the oil for cooling the electric motor M.

In that vehicle drive device, when the cooling water enters the oil for cooling the electric motor M, the oil containing the cooling water is supplied to the electric motor M. Since water is electrically conductive, a short circuit may occur in the electric motor M.

SUMMARY

The present invention provides a vehicle drive device capable of preventing a short circuit from occurring even when a conductive temperature-control medium enters a non-conductive temperature-control medium for controlling a temperature of an electric motor.

A vehicle drive device according to the present invention includes:

a first electric machine:
an electric machine housing accommodating the first electric machine;
a live part that is provided inside the electric machine housing and is electrically connected to the first electric machine; and
a temperature-control circuit for temperature control for the first electric machine, in which
the temperature-control circuit includes:
a first temperature-control circuit through which a non-conductive first temperature-control medium circulates;
a second temperature-control circuit through which a conductive second temperature-control medium circulates; and
a heat exchanger configured to exchange heat between the first temperature-control medium and the second temperature-control medium,
at least some of the first temperature-control medium passes inside the electric machine housing for the temperature control for the first electric machine,
the first temperature-control circuit includes a dropping pipe that is disposed inside the electric machine housing and above the first electric machine, extends in an axial direction of the first electric machine, and from which the first temperature-control medium drops onto the first electric machine,
the live part is provided on a radially outer side of the first electric machine such that the live part overlaps with the first electric machine in the axial direction of the first electric machine, and
a protection cover including a first protection wall extending in the axial direction of the first electric machine on the radially outer side of the first electric machine and between the first electric machine and the live part is provided inside the electric machine housing.

DESCRIPTION OF EMBODIMENTS

In the following, an embodiment of a vehicle on which a vehicle drive device of the present invention is mounted will be described with reference to the drawings. For the sake of convenience, a front-rear (Fr-Rr) direction, a left-right (L-R) direction, and an up-down (U-D) direction refers to directions viewed from a driver of the vehicle.

Figure 1:
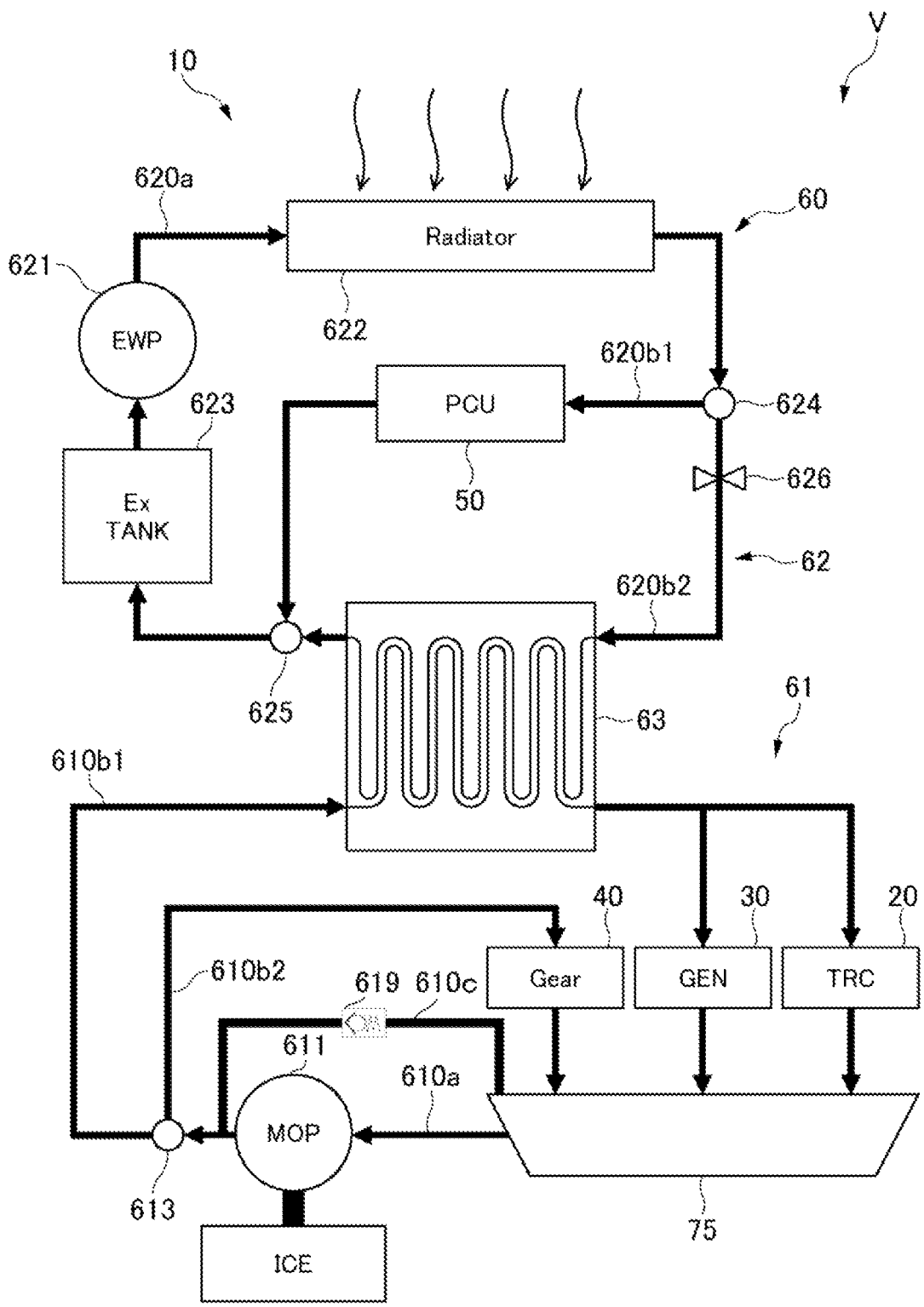
FIG. 1 is a system block diagram of a vehicle drive device according to an embodiment of the present invention.

As shown in FIG. 1, a vehicle drive device 10 according to the present embodiment includes: an internal combustion engine ICE; an electric motor 20; a generator 30; a transmission device 40; a power conversion device 50; and a temperature-control circuit 60 and is mounted on a vehicle V.

The electric motor 20 is an electric machine configured to output power for driving the vehicle V using electric power stored in a power storage device (not shown) mounted on the vehicle V or generated by the generator 30. When the vehicle V brakes, the electric motor 20 may generate electric power from kinetic energy of drive wheels of the vehicle V to charge the power storage device.

The generator 30 is an electric machine configured to generate electric power from power of the internal combustion engine ICE mounted on the vehicle V to charge the power storage device or to supply the electric power to the electric motor 20.

Detailed configurations of the electric motor 20 and the generator 30 will be described later.

The transmission device 40 is configured to reduce a speed of the electric motor 20 to a speed of the drive wheels and may be a gearbox.

The power conversion device 50 includes: a power drive unit (PDU, not shown) configured to convert the electric power output from the power storage device from direct current to alternating current to control input/output power of the electric motor 20 and the generator 30; and a voltage control unit (VCU, not shown) configured to step up voltage of the electric power output from the power storage device as necessary. The VCU may step down voltage of the electric power generated by the electric motor 20 when the electric motor 20 generates electric power during the braking of the vehicle V.

The temperature-control circuit 60 includes: a first temperature-control circuit 61 through which a non-conductive first temperature-control medium TCM1 circulates to control temperatures of the electric motor 20, the generator 30, and the transmission device 40; a second temperature-control circuit 62 through which a conductive second temperature-control medium TCM2 circulates to control a temperature of the power conversion device 50; and a heat exchanger 63 configured to exchange heat between the first temperature-control medium TCM1 and the second temperature-control medium TCM2. The non-conductive first temperature-control medium TCM1 is, for example, oil called automatic transmission fluid (ATF) capable of lubrication and temperature control for the electric motor 20, the generator 30, and the transmission device 40. The conductive second temperature-control medium TCM2 is, for example, cooling water called long-life coolant (LLC).

The first temperature-control circuit 61 is provided with a first pump 611. The first pump 611 is, for example, a mechanical pump driven by power of the internal combustion engine ICE and a rotational force of an axle (not shown) of the vehicle V. The first temperature-control circuit 61 includes a branching portion 613. The first temperature-control circuit 61 includes: a pumping flow path 610a in which the first pump 611 is provided, whose upstream end is connected to a storage unit 75 (see FIG. 2) of an electric machine housing 70, and whose downstream end is connected to the branching portion 613; a first branch flow path 610b1 in which the electric motor 20 and the generator 30 are provided, whose upstream end is connected to the branching portion 613, and whose downstream end is connected to the storage unit 75 of the electric machine housing 70; and a second branch flow path 610b2 in which the transmission device 40 is provided, whose upstream end is connected to the branching portion 613, and whose downstream end is connected to the storage unit 75 of the electric machine housing 70. In the first temperature-control circuit 61, the heat exchanger 63 is disposed upstream from the electric motor 20 and the generator 30, which are in the first branch flow path 610b1. Details of the storage unit 75 of the electric machine housing 70 will be described later.

Therefore, in the first temperature-control circuit 61, there are provided in parallel: a flow path in which the first temperature-control medium TCM1 pumped from the first pump 611 flows through the first branch flow path 610b1 via the branching portion 613, is cooled by the heat transfer with the second temperature-control medium TCM2 in the heat exchanger 63, is supplied to the electric motor 20 and the generator 30 for lubrication and temperature control for the electric motor 20 and the generator 30, and is collected in the storage unit 75 of the electric machine housing 70; and a flow path in which the first temperature-control medium TCM1 pumped from the first pump 611 flows through the second branch flow path 610b2 via the branching portion 613, is supplied to the transmission device 40 for lubrication and temperature control for the transmission device 40, and is collected in the storage unit 75 of the electric machine housing 70. The first temperature-control medium TCM1 collected in the storage unit 75 of the electric machine housing 70 then flows through the pumping flow path 610a and is supplied to the first pump 611, thereby the first temperature-control medium TCM1 circulating through the first temperature-control circuit 61.

In the present embodiment, the first branch flow path 610b1 and the second branch flow path 610b2 are formed such that a flow rate of the first temperature-control medium TCM1 flowing through the first branch flow path 610b1 is larger than a flow rate of the first temperature-control medium TCM1 flowing through the second branch flow path 610b2.

The first temperature-control circuit 61 further includes a pressure adjustment circuit 610c whose upstream end is connected to the storage unit 75 and whose downstream end is connected to the pumping flow path 610a downstream from the first pump 611. The pressure adjustment circuit 610c is provided with a pressure adjustment valve 619. The pressure adjustment valve 619 may be a check valve or an electrically-actuated valve such as a solenoid valve. When liquid pressure of the first temperature-control medium TCM1 pumped from the first pump 611 exceed a predetermined upper limit pressure, the pressure adjustment valve 619 is opened to return some of the first temperature-control medium TCM1 pumped from the first pump 611 to the storage unit 75. Accordingly, the liquid pressure of the first temperature-control medium TCM1 flowing through the first branch flow path 610b1 and the second branch flow path 610b2 is kept below the upper limit pressure.

The second temperature-control circuit 62 is provided with a second pump 621, a radiator 622, and a storage tank 623. The second pump 621 is, for example, an electric pump driven by the electric power stored in the power storage device. The radiator 622 is disposed in the front of the vehicle V and is configured to cool the second temperature-control medium TCM2 using wind raised by traveling of the vehicle V. The storage tank 623 is a tank in which the second temperature-control medium TCM2 circulating through the second temperature-control circuit 62 is temporarily stored. Even when cavitation occurs in the second temperature-control medium TCM2 circulating through the second temperature-control circuit 62, the cavitation disappears as the second temperature-control medium TCM2 circulating through the second temperature-control circuit 62 is temporarily stored in the storage tank 623.

The second temperature-control circuit 62 includes a branching portion 624 and a merging portion 625. The second temperature-control circuit 62 includes a pumping flow path 620a in which the storage tank 623, the second pump 621, and the radiator 622 are provided downstream in this order, whose upstream end is connected to the merging portion 625, and whose downstream end is connected to the branching portion 624. The second temperature-control medium TCM2 stored in the storage tank 623 is pumped by the second pump 621 through the pumping flow path 620a and is cooled by the radiator 622.

The second temperature control circuit 62 further includes: a first branch flow path 620b1 in which the power conversion device 50 is provided, whose upstream end is connected to the branching portion 624, and whose downstream end is connected to the merging portion 625; and a second branch flow path 620b2 in which the heat exchanger 63 is provided, whose upstream end is connected to the branching portion 624, and whose downstream end is connected to the merging portion 625. In the present embodiment, a valve device 626 is provided in the second branch flow path 620b2 upstream from the heat exchanger 63. In the present embodiment, the valve device 626 may be an on/off valve configured to switch the second branch flow path 620b2 between a fully open state and a fully closed state or a control valve capable of adjusting a flow rate of the second temperature-control medium TCM2 flowing through the second branch flow path 620b2.

Therefore, the second temperature-control medium TCM2 pumped by the second pump 621 and cooled by the radiator 622 in the pumping flow path 620a branches into the first branch flow path 620b1 and the second branch flow path 620b2 from the branching portion 624. The second temperature-control medium TCM2 flowing through the first branch flow path 620b1 cools the power conversion device 50 and merges with the second branch flow path 620b2 and the pumping flow path 620a at the merging portion 625. The second temperature-control medium TCM2 flowing through the second branch flow path 620b2 cools the first temperature-control medium TCM1 by heat transfer with the first temperature-control medium TCM1 in the heat exchanger 63 and merges with the first branch flow path 620b1 and the pumping flow path 620a at the merging portion 625. The second temperature-control medium TCM2 flowing through the first branch flow path 620b1 or the second temperature control medium TCM2 flowing through the second branch flow path 620b2 is merged at the merging portion 625, flows through the pumping flow path 620a, and is temporarily stored in the storage tank 623. Then, the second temperature-control medium TCM2 stored in the storage tank 623 is supplied back to the second pump 621 through the pumping flow path 620a, thereby the second temperature-control medium TCM2 circulating through the second temperature-control circuit 62.

In the first temperature-control circuit 61, after the first temperature-control medium TCM1 cools the electric motor 20, the generator 30, and the transmission device 40, a temperature of the first temperature control medium TCM1 stored in the storage unit 75 of the electric machine housing 70 is about 120 [° C.]. The first temperature-control medium TCM1 of about 100 [° C.] is supplied to the heat exchanger 63.

Meanwhile, in the second temperature-control circuit 62, a temperature of the second temperature-control medium TCM2 cooled by the radiator 622 is about 40 [° C.]. Since the second temperature-control medium TCM2 supplied to the heat exchanger 63 does not pass through the power conversion device 50, which is a target of temperature control, the second temperature-control medium TCM2 of about 40 [° C.] is supplied to the heat exchanger 63.

The heat exchanger 63 exchanges heat between the first temperature-control medium TCM1 of about 100 [° C.] and the second temperature-control medium TCM2 of about 40 [° C.] that are supplied to the heat exchanger 63. Then, the first temperature-control medium TCM1 of about 80 [° C.] is discharged from the heat exchanger 63 to a downstream side of the first branch flow path 610b1 of the first temperature control circuit 61, and the second temperature-control medium TCM2 of about 70 [° C.] is discharged from the heat exchanger 63 to a downstream side of the second branch flow path 620b2 of the second temperature-control circuit 62.

Since the first temperature-control medium TCM1 is cooled in the heat exchanger 63 in this way, the temperature-control circuit 60 can cool the first temperature-control medium TCM1 without a radiator dedicated to the first temperature-control medium TCM1. Therefore, since the temperature-control circuit 60 can cool the first temperature-control medium TCM1 flowing through the first temperature-control circuit 61 and the second temperature-control medium TCM2 flowing through the second temperature-control circuit 62 by one radiator 622, the temperature-control circuit 60 can be miniaturized.

If the first temperature-control medium TCM1 is ATF, viscosity of the first temperature-control medium TCM1 increases as a temperature of the first temperature-control medium TCM1 decreases. If the viscosity increases, friction loss in the electric motor 20 and the generator 30 increases since the first temperature-control medium TCM1 flows through the electric motor 20 and the generator 30, and output efficiency of the electric motor 20 and the generator 30 decreases. Therefore, when the electric motor 20 and the generator 30 are not at a high temperature and a temperature of the first temperature-control medium TCM1 is below a predetermined temperature and the first temperature-control medium TCM1 does not need to be cooled, for example, when the vehicle V is started, it is preferable that the first temperature-control medium TCM1 be not cooled.

Since the valve device 626 is provided in the second branch flow path 620b2 of the second temperature control circuit 62 upstream from the heat exchanger 63, the valve device 626 can be completely closed to block the second temperature-control medium TCM2 from flowing through the second branch flow path 620b2. In this case, the second temperature-control medium TCM2 is not supplied to the heat exchanger 63. Therefore, heat transfer is not performed between the first temperature-control medium TCM1 and the second temperature-control medium TCM2, and the first temperature-control medium TCM1 is not cooled. Accordingly, it is possible to prevent the heat exchanger 63 from cooling the first temperature-control medium TCM1 when the first temperature-control medium TCM1 does not need to be cooled.

Figure 2:
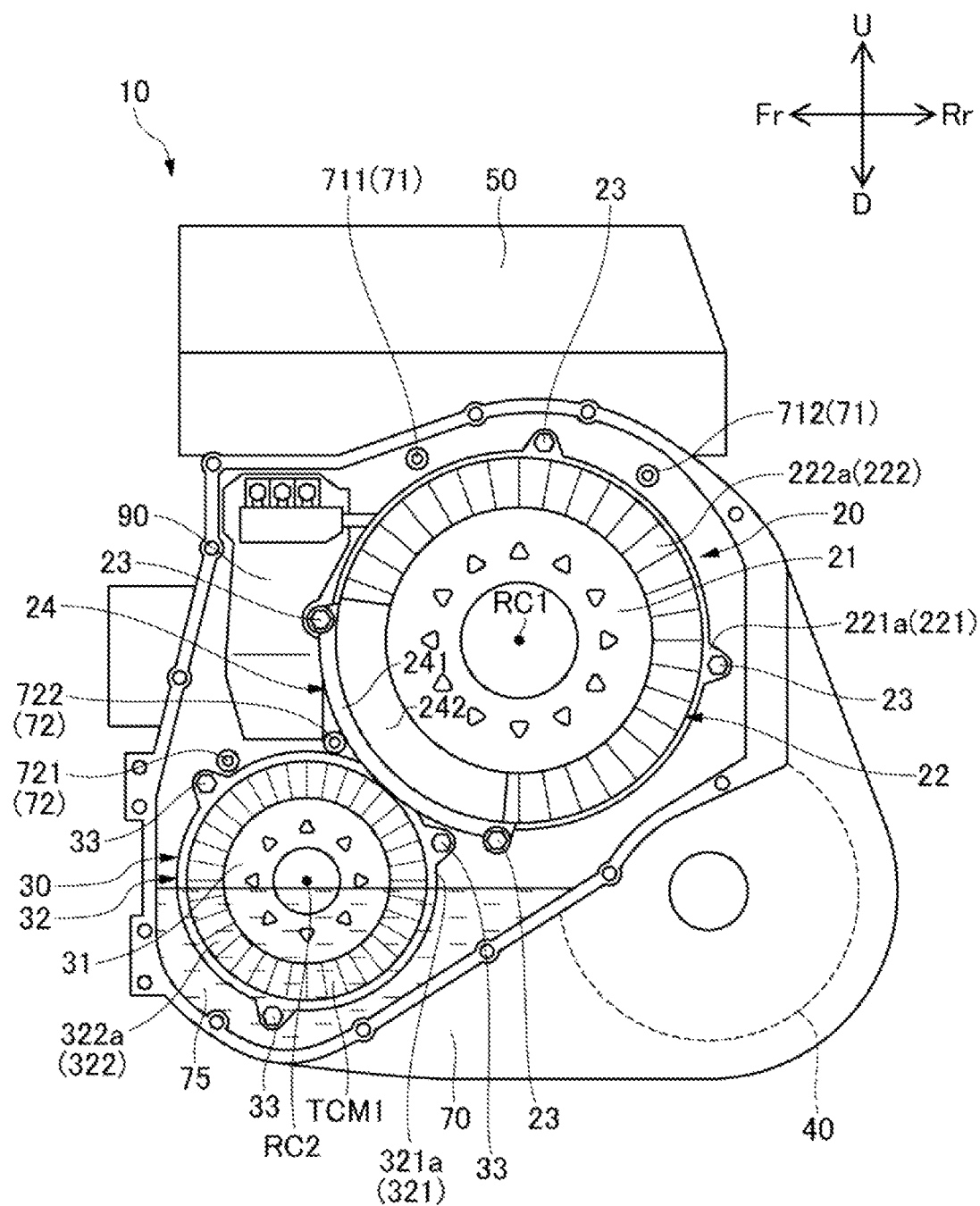
FIG. 2 is an internal view of an interior an electric machine housing in the vehicle drive device of FIG. 1 as viewed from the left side.
Figure 3:
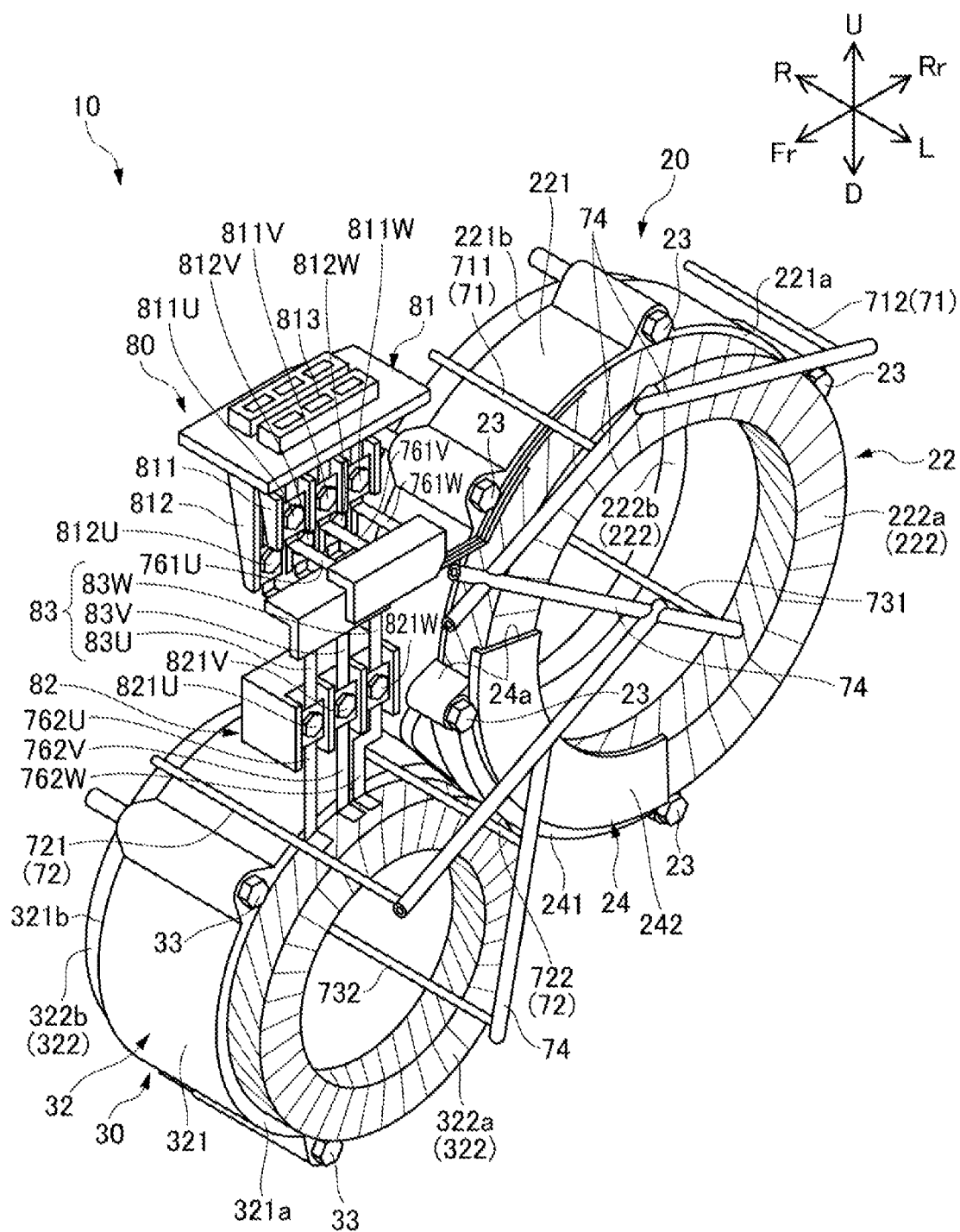
FIG. 3 is a perspective view of parts inside the electric machine housing shown in FIG. 2.
Figure 4:
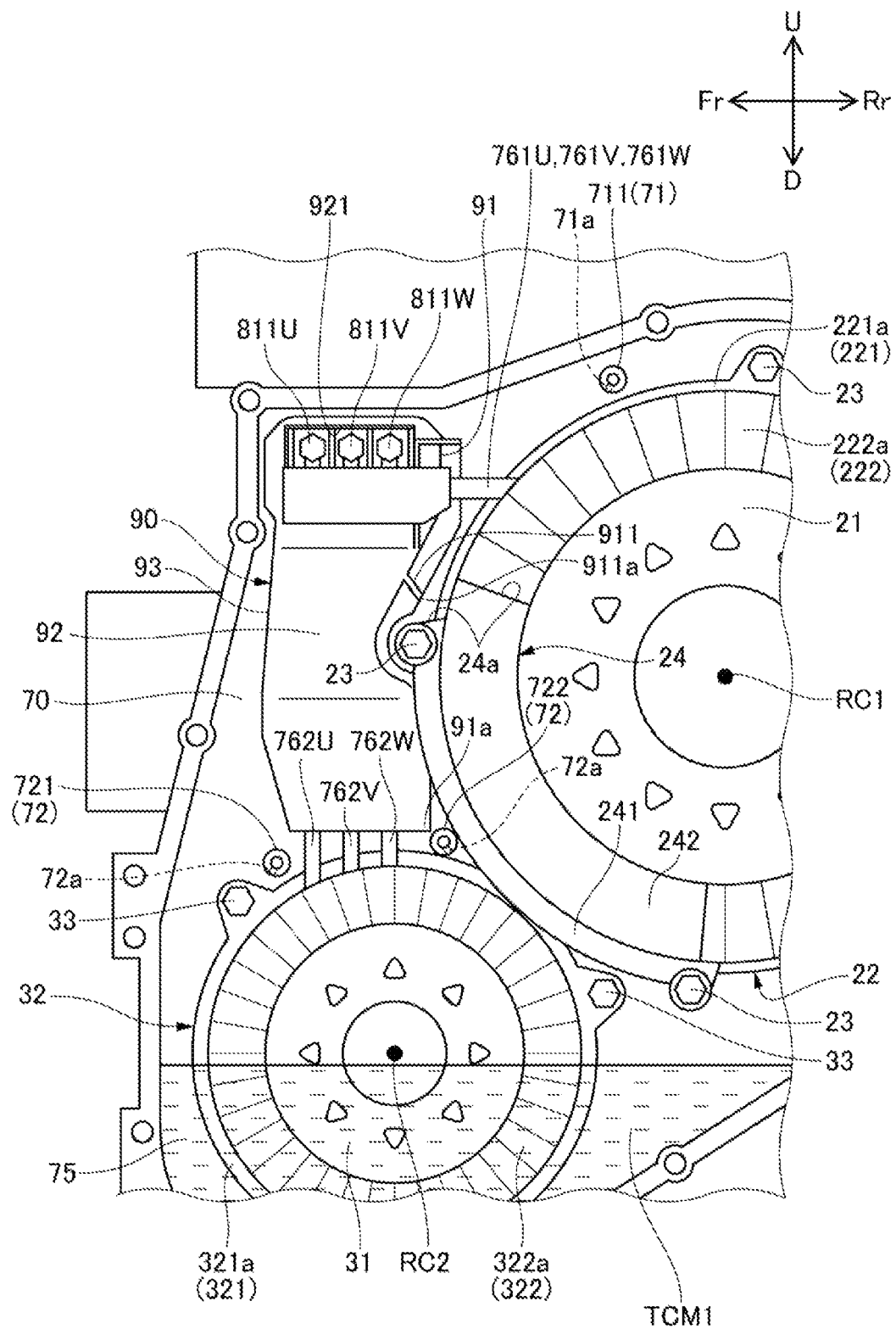
FIG. 4 is an enlarged view around a protection cover shown in FIG. 2.

As shown in FIGS. 2 to 4, the vehicle drive device 10 further includes the electric machine housing 70 in which the electric motor 20, the generator 30, and the transmission device 40 are accommodated.

The electric motor 20 includes: a substantially annular-shaped rotor 21 configured to rotate around a first rotation axis RC1 extending horizontally in a vehicle width direction of the vehicle V; and a stator 22 disposed at a predetermined distance in a radial direction from the circumference of the rotor 21. The stator 22 includes: a substantially annular-shaped stator core 221 having a cylindrical inner surface spaced apart from the circumference of the rotor 21 in the radial direction by a predetermined distance; and a coil 222 that is attached to the stator core 221 and has a substantially annular shape when viewed in an axial direction of the first rotation axis RC1, that is, the vehicle width direction of the vehicle V. The stator core 221 is fixed to the electric machine housing 70 with fastening bolts 23 inserted through through holes formed in the stator core 221 and penetrating in the axial direction of the first rotation axis RC1. The coil 222 constitutes a three-phase winding of U, V, and W phases. The coil 222 includes a left end portion 222a protruding outward in the axial direction of the first rotation axis RC1 from an end surface of the stator core 221 on one side in the axial direction of the first rotation axis RC1. In the present embodiment, the left end portion 222a protrudes in the left direction from a left end surface 221a. Similarly, the coil 222 includes a right end portion 222b protruding outward in the axial direction of the first rotation axis RC1 from another end surface of the stator core 221 on the other side in the axial direction of the first rotation axis RC1. In the present embodiment, the right end portion 222b protrudes in the right direction from a right end surface 221b.

The generator 30 includes: a substantially annular-shaped rotor 31 configured to rotate around a second rotation axis RC2 that is extending horizontally in the vehicle width direction of the vehicle V and is parallel to the first rotation axis RC1; and a stator 32 disposed at a predetermined distance in the radial direction from the circumference of the rotor 31. The second rotation axis RC2 is anterior to and below the first rotation axis RC1. The generator 30 is disposed such that, at least in part, the generator 30 overlaps the electric motor 20 in the axial direction of the first rotation axis RC1 and the second rotation axis RC2, that is, in the vehicle width direction of the vehicle V. The stator 32 includes: a substantially annular-shaped stator core 321 having a cylindrical inner surface radially spaced apart from the circumference of the rotor 31 by a predetermined distance; and a coil 322 that is attached to the stator core 321 and has a substantially annular shape when viewed in the axial direction of the second rotation axis RC2, that is, in the vehicle width direction of the vehicle V. The stator core 321 is fixed to the electric machine housing 70 by fastening bolts 33 inserted through through holes formed in the stator core 321 and penetrating in the axial direction of the second rotation axis RC2. The coil 322 constitutes a three-phase winding of U, V, and W phases. The coil 322 includes a left end portion 322a protruding outward in the axial direction of the second rotation axis RC2 from an end surface of the stator core 321 on one side in the axial direction of the second rotation axis RC2. In the present embodiment, the left end portion 322a protrudes in the left direction from a left end surface 321a Similarly, the coil 322 includes a right end portion 322b protruding outward in the axial direction of the second rotation axis RC2 from another end surface of the stator core 321 on the other side in the axial direction of the second rotation axis RC2.

The electric motor 20 is provided with a coil protection member 24 covering the left end portion 222a in a circumferential direction at least in part. The coil protection member 24 covers a front lower portion of the left end portion 222a.

The coil protection member 24 includes: a first protection member 241 that is fixed to the stator core 221, protrudes outward in the axial direction of the first rotation axis RC1, that is, protrudes in the left direction from the left end surface 221a, has a substantially arc shape when viewed in the axial direction of the first rotation axis RC1, that is, in the vehicle width direction, and covers an outer surface of a front lower portion of the left end portion 222a; and a second protection member 242 that is fixed to the first protection member 241, has a substantially arc shape extending in the radial direction and the circumferential direction of the first rotation axis RC1 when viewed in the axial direction of the first rotation axis RC1, that is, in the vehicle width direction, and covers a left end surface of a front lower portion of the left end portion 222a in the axial direction.

The first protection member 241 is formed of, for example, die-cast alloy. Since the first protection member 241 covers the outer surface of the front lower portion of the left end portion 222a, the first protection member 241 is disposed between the left end portion 222a and the left end portion 322a of the generator 30 disposed on a front lower side of the electric motor 20. Therefore, the first protection member 241 prevents the left end portion 322a from directly hitting the left end portion 222a when strain is put on the electric machine housing 70 from the front to move the generator 30 backward, for example, in case of frontal impact. Accordingly, it is possible to prevent a short circuit by direct contact between the left end portion 322a and the left end portion 222a from occurring.

The second protection member 242 is formed of, for example, a resin. The second protection member 242 covers the left end surface of the front lower portion of the left end portion 222a in the axial direction. When strain is put on the electric machine housing 70 to deform or damage the electric machine housing 70, for example, in case of frontal impact, the second protection member 242 prevents the deformed electric machine housing 70 or broken pieces of the damaged electric machine housing 70 from directly hitting the left end portion 322a. In this case, the electric motor 20 can be driven by a limp-home mode or the like, and thereby the vehicle V can travel short distance to, for example, a nearby garage or home.

Inside the electric machine housing 70, there are provided: a first dropping pipe 71 disposed above the electric motor 20 and extending in the axial direction of the first rotation axis RC1; and a second dropping pipe 72 disposed above the generator 30 and extending in the axial direction of the second rotation axis RC2. In the present embodiment, the first dropping pipe 71 includes two dropping pipes of: a front first dropping pipe 711 that extends in the axial direction of the first rotation axis RC1 and is anterior to the first rotation axis RC1; and a rear first dropping pipe 712 that extends in the axial direction of the first rotation axis RC1 and is posterior to the first rotation axis RC1. The second dropping pipe 72 includes two dropping pipes of: a front second dropping pipe 721 that extends in the axial direction of the second rotation axis RC2 and is anterior to the second rotation axis RC2; and a rear second dropping pipe 722 that extends in the axial direction of the second rotation axis RC2 and is posterior to the second rotation axis RC2.

In the present embodiment, inside the electric machine housing 70, there are provided; a first axial pipe 731 extending inside a hollow rotor shaft (not shown) of the electric motor 20 in the axial direction of the first rotation axis RC1; and a second axial pipe 732 extending inside a hollow rotor shaft (not shown) of the generator 30 in the axial direction of the second rotation axis RC2.

Further, in the present embodiment, there are provided introduction pipes 74 that brings the first temperature-control medium TCM1 into the electric machine housing 70 and connects the first dropping pipe 71, the second dropping pipe 72, the first axial pipe 731, and the second axial pipe 732. Therefore, by the introduction pipes 74, the first temperature control medium TCM1 is introduced into the rotary electric machine housing 70 from the outside of the rotary electric machine housing 70, and the first temperature control medium TCM1 is supplied to the first dropping pipe 71, the second dropping pipe 72, the first axial pipe 731, and the second axial pipe 732.

Therefore, the non-conductive first temperature-control medium TCM1 flows through the first dropping pipe 71, the second dropping pipe 72, the first axial pipe 731, and the second axial pipe 732. In this way, the first dropping pipe 71, the second dropping pipe 72, the first axial pipe 731, and the second axial pipe 732 constitute the first branch flow path 610b1 of the first temperature-control circuit 61 inside the electric machine housing 70.

On an outer surface of the first dropping pipe 71, dropping holes 71a opened downward are formed along the first rotation axis RC1, and the first temperature-control medium TCM1 flowing through the first dropping pipe 71 drops from the dropping holes 71a of the first dropping pipe 71 onto the electric motor 20. The first temperature control-medium TCM1 dropping from the dropping holes 71a of the first dropping pipe 71 onto the electric motor 20 hits and cools the electric motor 20 and then flows down below the electric motor 20 by gravity.

On an outer surface of the second dropping pipe 72, dropping holes 72a opened downward are formed along the second rotation axis RC2, and the first temperature-control medium TCM1 flowing through the second dropping pipe 72 drops from the dropping holes 72a of the second dropping pipe 72 onto the generator 30. The first temperature-control medium TCM1 dropping from the dropping holes 72a of the second dropping pipe 72 on to the generator 30 hits and cools the generator 30 and then flows down below the generator 30 by gravity.

On an outer surface of the first axial pipe 731, supply holes are formed along the first rotation axis RC1 to supply the first temperature-control medium TCM1 flowing through the first axial pipe 731 from the supply holes of the first axial pipe 731 to the hollow of the rotor shaft of the electric motor 20. The first temperature-control medium TCM1 supplied from the supply holes of the first axial pipe 731 to the hollow of the rotor shaft of the electric motor 20 is supplied to and cools the rotor 21 and the stator 22 and then flows down below the electric motor 20 by gravity.

On an outer surface of the second axial pipe 732, supply holes (not shown) are formed along the second rotation axis RC2 to supply the first temperature-control medium TCM1 flowing through the second axial pipe 732 from the supply holes of the second axial pipe 732 to the hollow of the rotor shaft of the generator 30. The first temperature-control medium TCM1 supplied from the supply holes of the second axial pipe 732 to the hollow of the rotor shaft of the generator 30 is supplied to and cools the rotor 31 and the stator 32 and then flows down below the generator 30 by gravity.

The storage unit 75 is formed in a lower portion of the electric machine housing 70. The storage unit 75 is formed below the generator 30 when viewed in the vehicle width direction and is formed such that the storage unit 75 overlaps the generator 30 in the front-rear direction at least in part. The first temperature-control medium TCM1 is stored in the storage unit 75. The first temperature-control medium TCM1 that drops from the first dropping pipe 71, cools the electric motor 20, and flows down below the electric motor 20 by gravity is collected in the storage unit 75. The first temperature control-medium TCM1 that drops from the second dropping pipes 72, cools the generator 30, and flows down below the generator 30 by gravity is collected in the storage unit 75. The first temperature control medium TCM1 that is supplied from the first axial pipe 731, cools the electric motor 20, and flows down below the electric motor 20 by gravity is collected in the storage unit 75. The first temperature control medium TCM1 that is supplied from the second axial pipe 732, cools the generator 30, and flows down below the generator 30 by gravity is collected in the storage unit 75.

The generator 30 is immersed in the first temperature-control medium TCM1 stored in the storage unit 75 at least in part. More specifically, in the generator 30, the rotor 31 is immersed in the first temperature-control medium TCM1 stored in the storage unit 75 at least in part. Therefore, when the generator 30 is driven, the first temperature control-medium TCM1 stored in the storage unit 75 is scooped up by the rotating rotor 31 and is sprinkled inside the electric machine housing 70 for temperature control for the electric motor 20, the generator 30, the transmission device 40, and the like. Accordingly, temperature-control performance of the vehicle drive device 10 is improved.

In this way, in the first temperature control circuit 61, at least the first dropping pipe 71, the second dropping pipe 72, the first axial pipe 731, the second axial pipe 732, and the introduction pipes 74 pass through inside the electric machine housing 70 for temperature control for the electric motor 20, the generator 30, and the transmission device 40.

A live part 80 is provided inside the electric machine housing 70. The live part 80 includes a connector unit 81, a terminal block 82, and a bus bar unit 83. The live part 80 is provided on a radially outer side of the electric motor 20 and the generator 30 such that the live part 80 overlaps with the electric motor 20 and the generator 30 in the axial direction of the first rotation axis RC1 and the second rotation axis RC2, that is, in the vehicle width direction. The live part 80 is disposed anterior to the electric motor 20 and above the generator 30. The live part 80 is disposed such that the live part 80 overlaps with the electric motor 20 in the up-down direction at least in part and with the generator 30 in the front-rear direction at least in part. That is, the generator 30 is located below the live part 80 when viewed in the vehicle width direction such that the generator 30 overlaps with the live part 80 in the front-rear direction at least in part.

The connector unit 81 includes: a first terminal unit 811 including three terminals of 811U for the U phase, 811V for the V phase, and 811W for the W phase; and a second terminal unit 812 including three terminals of 812U for the U phase, 812V for the V phase, and 812W for the W phase. The connector unit 81 further includes a six-phase connector unit 813 electrically connected to the six terminals of the three terminals 811U, 811V, and 811W of the first terminal unit 811 and the three terminals 812U, 812V, and 812W of the second terminal unit 812. The six-phase connector unit 813 is electrically connected to the six terminals of the three terminals 811U, 811V, and 811W of the first terminal unit 811 and the three terminals 812U, 812V, and 812W of the second terminal unit 812 by bus bars (not shown). The six-phase connector unit 813 is electrically connected to the power conversion device 50 by a cable harness, a bus bar, or the like.

In the present embodiment, the first terminal unit 811 is disposed on the left of the second terminal unit 812 in the vehicle width direction, and the three terminals of 811U for the U phase, 811V for the V phase, and 811W for the W phase are disposed abreast in the front-rear direction of the vehicle V. The second terminal unit 812 is disposed on the right of the first terminal unit 811 in the vehicle width direction similarly to the first terminal unit 811 in the front-rear direction, and the three terminals of 812U for the U phase, 812V for the V phase, and 812W for the W phase are disposed abreast in the front-rear direction of the vehicle V. The second terminal unit 812 is located below the first terminal unit 811.

The terminal block 82 includes three terminals of 821U for the U phase, 821V for the V phase, and 821W for the W phase.

The bus bar unit 83 includes three bus bars of 83U for the U phase, 83V for the V phase, and 83W for the W phase. The bus bar 83U for the U phase connects the terminal 812U for the U phase of the second terminal unit 812 of the connector unit 81 and the terminal 821U for the U phase of the terminal block 82. The bus bar 83V for the V phase connects the terminal 812V for the V phase of the second terminal unit 812 of the connector unit 81 and the terminal 821V for the V phase of the terminal block 82. The bus bar 83W for the W phase connects the terminal 812W for the W phase of the second terminal unit 812 of the connector unit 81 and the terminal 821W for the V phase of the terminal block 82.

Inside the electric machine housing 70, there are provided: first wiring members 761U for the U phase electrically connecting the terminal 811U for the U phase of the first terminal unit 811 and winding for the U phase of the coil 222; 761V for the V phase electrically connecting the terminal 81/V for the V phase of the first terminal unit 811 and winding for the V phase of the coil 222; and 761W for the W phase electrically connecting the terminal 811W for the W phase of the first terminal unit 811 and winding for the W phase of the coil 222. An end of the first wiring members 761U, 761V, and 761W is connected to the three terminals 811U. 811V, and 811W of the first terminal unit 811, and the other end is connected to the windings of the coil 222.

Inside the electric machine housing 70, there are provided: second wiring members 762U for the U phase electrically connecting the terminal 821U for the U phase of the terminal block 82 and winding for the U phase of the coil 322; 762V for the V phase electrically connecting the terminal 821V for the V phase of the terminal block 82 and winding for the V phase of the coil 322; and 762W for the W phase electrically connecting the terminal 821W for the W phase of the terminal block 82 and winding for the W phase of the coil 322. An end of the second wiring members 762U, 762V, and 762W is connected to the three terminals 821U, 821V, and 821W of the generator terminal block 82, and the other end is connected to the windings of the coil 322.

Therefore, the windings of the coil 222 are electrically connected to the power conversion device 50 via the first wiring members 761U, 761V, and 761W and the connector unit 81 of the live part 80. The windings of the coil 322 are electrically connected to the power conversion device 50 via the second wiring members 762U, 762V, and 762W, the bus bar unit 83, and the connector unit 81 of the live part 80. Input/output power of the electric motor 20 and the generator 30 are controlled by the power conversion device 50.

A protection cover 90 covering the live part 80 is further provided inside the electric machine housing 70. The protection cover 90 is formed of a non-conductive material, for example, a resin.

Figure 5:
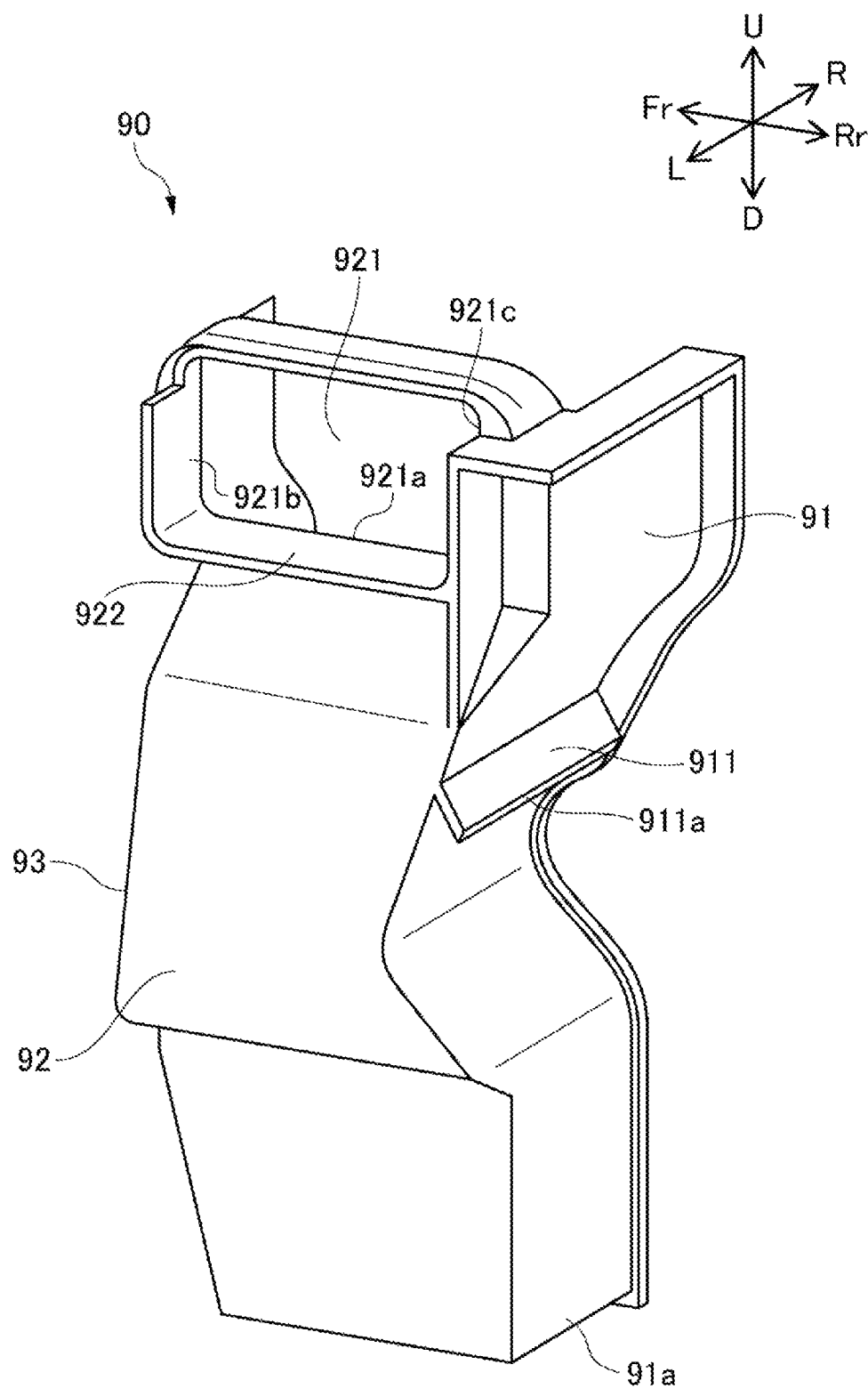
FIG. 5 is a perspective view of the protection cover of the vehicle drive device according to an embodiment of the present invention.

As shown in FIGS. 4 and 5, the protection cover 90 includes: a first protection wall 91 extending in the axial direction of the first rotation axis RC1 and in the up-down direction in the radially outer side of the electric motor 20 and between the electric motor 20 and the live part 80 to cover a rear side of the live part 80; a second protection wall 92 extending in the up-down direction and in the front-rear direction to cover a left side of the live part 80 in the vehicle width direction; and a third protection wall 93 extending in the axial direction of the first rotation axis RC1 and in the up-down direction in front of the live part 80 to cover a front side of the live part 80. In the protection cover 90, the first protection wall 91, the second protection wall 92, and the third protection wall 93 are integrally formed. The first protection wall 91 is connected to a rear end portion of the second protection wall 92 and extends toward a right side in the vehicle width direction. The third protection wall 93 is connected to a front end portion of the second protection wall 92 and extends toward the right side in the vehicle width direction.

In the present embodiment, the first protection wall 91 extends in the axial direction of the first rotation axis RC1 and the up-down direction, and a middle portion of the first protection wall 91 in the up-down direction has a shape curved and recessed forward along the stator core 221 when viewed in the vehicle width direction. The second protection wall 92 extends in the up-down direction and the front-rear direction, and a middle portion of the second protection wall in the up-down direction has a shape protruding outward in the vehicle width direction, that is, protruding in the left direction.

In the temperature-control circuit 60, if the heat exchanger 63 is damaged, some of the second temperature-control medium TCM2 flowing through the second temperature-control circuit 62 may flow into the first temperature-control circuit 61, through which the first temperature-control medium TCM1 flows, and the conductive second temperature-control medium TCM2 may enter the non-conductive first temperature-control medium TCM1. If the conductive second temperature-control medium TCM2 enters the non-conductive first temperature-control medium TCM1, the first temperature-control medium TCM1 containing the second temperature-control medium TCM2 may scatter from the electric motor 20 and adhere to the live part 80. In this case, since the second temperature-control medium TCM2 is electrically conductive, a short circuit may occur, for example, among the terminals 811U, 811V, and 811W of the first terminal unit 811.

In the present embodiment, since the protection cover 90 includes the first protection wall 91 extending in the axial direction of the first rotation axis RC1 and the up-down direction in the radially outer side of the electric motor 20 and between the electric motor 20 and the live part 80 to cover the rear side of the live part 80, even when the conductive second temperature-control medium TCM2 enters the non-conductive first temperature-control medium TCM1 for temperature control for the electric motor 20, the first protection wall 91 can prevent the first temperature-control medium TCM1 containing the conductive second temperature-control medium TCM2 from scattering from the electric motor 20 to adhere to the live part 80. Accordingly, even when the conductive second temperature-control medium TCM2 enters the non-conductive first temperature-control medium TCM1 for temperature control for the electric motor 20, the short circuit can be prevented from occurring.

In an upper portion of the second protection wall, an opening 921 in the vehicle width direction is formed. Through the opening 921, the first wiring members 761U, 761V, and 761W electrically connecting the terminals 811U, 811V, and 811W of the first terminal unit 811 of the live part 80 and the windings of the coil 222 of the electric motor 20 are inserted.

A lower side of the live part 80 is not covered with the protection cover 90. The second wiring members 762U, 762V, and 762W extend upward from the coil 322 of the generator 30 through the lower side of the live part 80 not covered by the protection cover 90 toward the terminals 821U, 821V. 821W of the terminal block 82 of the live part 80.

As described above, when the generator 30 is driven, the first temperature-control medium TCM1 stored in the storage unit 75 is scooped up by the rotating rotor 31 and is sprinkled inside the electric machine housing 70. Since the outer surface of the rotor 31 is covered with the stator 32, the first temperature-control medium TCM1 scooped up by the rotor 31 is mainly sprinkled from both end surfaces of the rotor 31 in the axial direction.

In the present embodiment, since the protection cover 90 includes the second protection wall 92 extending in the up-down direction and in the front-rear direction and covering the left side of the live part 80 in the vehicle width direction, the second protection wall 92 can prevent the first temperature-control medium TCM1 that is scooped up by the rotor 31 and is sprinkled from the end surface of the rotor 31 in the axial direction on the left side in the vehicle width direction from adhering to the live part 80 from the left side in the vehicle width direction.

Therefore, even when the conductive second temperature-control medium TCM2 enters the non-conductive first temperature control medium TCM1 and the first temperature-control medium TCM1 in the storage unit 75 containing the second temperature-control medium TCM2 is scooped up by the rotating rotor 31 and is sprinkled inside the electric machine housing 70, it is possible to prevent the first temperature-control medium TCM1 containing the conductive second temperature-control medium TCM2 from adhering to the live part 80. Accordingly, the short circuit can be prevented from occurring.

The protection cover 90 is provided with a guiding inclined portion 911 that protrudes from the first protection wall 91 toward the electric motor 20 and extends in the up-down direction and in the vehicle width direction (the axial direction of the first rotation axis RC1). In the present embodiment, when viewed in the vehicle width direction, the guiding inclined portion 911 protrudes rearward from the first protection wall 91, slants downward from front to rear, and extends in the up-down direction and in the vehicle width direction (the axial direction of the first rotation axis RC1).

Therefore, the first temperature control medium TCM1 that is sprinkled from the electric motor 20 and adheres to the first protection wall 91 above the guiding inclined portion 911 of the protection cover 90 flows downward along the first protection wall 91 and the guiding inclined portion 911 by gravity and is discharged toward the electric motor 20 from an end portion 911a of the guiding inclined portion 911. Accordingly, the first temperature-control medium TCM1 adhering to the first protection wall 91 above the guiding inclined portion 911 of the protection cover 90 can be supplied back to the electric motor 20 from the end portion 911a of the guiding inclined portion 911 for temperature control for the electric motor 20, and thereby enabling more efficient temperature control for the electric motor 20.

Most of the first temperature-control medium TCM1 dropping from the first dropping pipe 71 flows along an outer surface of the substantially annular-shaped left end portion 222a. When the first temperature-control medium TCM1 dropping from the front first dropping pipe 711 and flowing along an outer surface of a front upper portion of the left end portion 222a reaches a front end surface of the left end portion 222a, the first temperature-control medium TCM1 flows downward in the up-down direction by gravity. Therefore, it is difficult to supply the first temperature-control medium TCM1 to the front lower portion of the left end portion 222a for temperature control.

In the present embodiment, when viewed in the vehicle width direction, the end portion 911a of the guiding inclined portion 911 is formed such that the end portion 911a overlaps with an upper end portion 24a of the coil protection member 24 in the front-rear direction above the coil protection member 24.

Therefore, the first temperature-control medium TCM1 supplied from the end portion 911a of the guiding inclined portion 911 toward the electric motor 20 is supplied from the upper end portions 24a of the coil protection member 24 to a space surrounded by the coil protection member 24 and the left end surface 221a of the stator core 221. Then, the first temperature control-medium TCM1 supplied to the space flows inside the space along the left end portion 222a for temperature control for the front lower portion of the left end portion 222a and is discharged from a lower end portion of the coil protection member 24 to an outside of the space. Accordingly, more efficient temperature control for the left end portion 222a can be achieved. In particular, the first temperature-control medium TCM1 can be supplied to the front lower portion of the left end portion 222a, for which appropriate temperature control is difficult.

The first protection wall 91 is formed, when viewed in the vehicle width direction, such that a lower end portion 91a of the first protection wall 91 overlaps the generator 30 in the front-rear direction.

Therefore, the first temperature-control medium TCM1 that is returned from the end portion 911a of the guiding inclined portion 911 to the first protection wall 91 below the guiding inclined portion 911 or that is sprinkled from the electric motor 20 and adheres to the first protection wall 91 below the guiding inclined portion 911 of the protection cover 90 flow downward along the first protection wall 91 by gravity and drops from the lower end portion 91a of the first protection wall 91 onto the generator 30. Accordingly, a larger amount of the first temperature-control medium TCM1 can be used, more efficient temperature control for the generator 30 can be achieved.

A lower edge portion 921a of the opening 921 formed in the second protection wall 92 is provided with an opening protection wall 922 protruding from the second protection wall 92 in the left direction, that is, in a direction away from the live part 80 in the vehicle width direction. In the present embodiment, the opening protection wall 922 is bent upward from a front end of the lower edge portion 921a of the opening 921 to extend to a front edge portion 921b of the opening 921 and is bent upward from a rear end of the lower edge portion 921a of the opening 921 to extend to a rear edge portion 921c of the opening 921. Therefore, the opening protection wall 922 protrudes from the second protection wall 92 in the left direction at the lower edge portion 921a, the front edge portion 921b, and the rear edge portion 921c of the opening 921 and has a substantially U-shaped when viewed from the vehicle width direction.

Therefore, the opening protection wall 922 can prevent the first temperature-control medium TCM1 that is scooped up by the rotor 31 and is sprinkled from the end surface in the axial direction on the left side in the vehicle width direction of the rotor 31 from entering, from the opening 921, the space in which the live part 80 is disposed. Accordingly, even when the conductive second temperature-control medium TCM2 enters the non-conductive first temperature-control medium TCM1 and the first temperature-control medium TCM1 in the storage unit 75 containing the second temperature-control medium TCM2 is scooped up by the rotating rotor 31 and is sprinkled inside the electric machine housing 70, it is possible to prevent the first temperature control medium TCM1 containing the conductive second temperature control medium TCM2 from entering from the opening 921 and adhering to the live part 80, and the short circuit can be prevented from occurring.

According to the present invention, the protection cover including: the first protection wall extending in the axial direction of the first electric machine in the radially outer side of the first electric machine and between the first electric machine and the live part. Even when the conductive second temperature-control medium enters the non-conductive first temperature-control medium for temperature control for the first electric machine, the first protection wall can prevent the first temperature-control medium containing the conductive second temperature-control medium from being sprinkled from the first electric machine and adhering to the live part. Accordingly, even when the conductive second temperature-control medium enters the non-conductive first temperature-control medium for temperature control for the first electric machine, a short circuit can be prevented from occurring.

Although an embodiment of the present invention has been described above with reference to the drawings, it goes without saying that the present invention is not limited thereto. It is obvious to those skilled in the art that various changes or modifications can be conceived within the scope of the claims, and it is understood that the various changes or modifications belong to the technical scope of the present invention. The components in the embodiment described above can be combined arbitrarily within the gist of the invention.

For example, in the present embodiment, the electric motor 20 has the first rotation axis RC1, and the generator 30 has the second rotation axis RC2 that extends horizontally in the vehicle width direction of the vehicle V, is parallel to the first rotation axis RC1, and is anterior to and below the first rotation axis RC1. However, positions of the electric motor 20 and the generator 30 may be reversed. That is, the generator 30 may have the first rotation axis RC1, and the electric motor 20 may have the second rotation axis RC2 that extends horizontally in the vehicle width direction of the vehicle V, is parallel to the first rotation axis RC1, and is anterior to and below the first rotation axis RC1.

For example, in the present embodiment, the first rotation axis RC1 and the second rotation axis RC2 extend horizontally in the vehicle width direction. However, the first rotation axis RC1 and the second rotation axis RC2 may extend horizontally in the front-rear direction of the vehicle V.

In the present specification, at least the following are described. In the parentheses, the corresponding components and the like in the above-described embodiment are shown as an example. However, the present invention is not limited thereto.

(1) A vehicle drive device (vehicle drive device 10) includes:
  a first electric machine (electric motor 20);
  an electric machine housing (electric machine housing 70) accommodating the first electric machine:
  a live part (live part 80) that is provided inside the electric machine housing and is electrically connected to the first electric machine; and
  a temperature-control circuit (temperature-control circuit 60) for temperature control for the first electric machine, in which
  the temperature-control circuit includes:
    a first temperature-control circuit (first temperature-control circuit 61) through which a non-conductive first temperature-control medium (first temperature-control medium TCM1) circulates;
    a second temperature-control circuit (second temperature-control circuit 62) through which a conductive second temperature-control medium (second temperature-control medium TCM2) circulates; and
    a heat exchanger (heat exchanger 63) configured to exchange heat between the first temperature-control medium and the second temperature-control medium,
  at least some of the first temperature-control medium passes inside the electric machine housing for the temperature control for the first electric machine,
  the first temperature-control circuit includes a dropping pipe (first dropping pipe 71) that is disposed inside the electric machine housing and above the first electric machine, extends in an axial direction of the first electric machine, and from which the first temperature-control medium drops onto the first electric machine,
  the live part is provided on a radially outer side of the first electric machine such that the live part overlaps with the first electric machine in the axial direction of the first electric machine, and
  a protection cover (protection cover 90) including a first protection wall (first protection wall 91) extending in the axial direction of the first electric machine on the radially outer side of the first electric machine and between the first electric machine and the live part is provided inside the electric machine housing.

According to (1), the protection cover including: the first protection wall extending in the axial direction in the radially outer side and between the first electric machine and the live part. Even when the conductive second temperature-control medium enters the non-conductive first temperature-control medium, the first protection wall can prevent the first temperature-control medium containing the conductive second temperature-control medium from being sprinkled from the first electric machine and adhering to the live part. Accordingly, even when the conductive second temperature-control medium enters the non-conductive first temperature-control medium, a short circuit can be prevented from occurring.

(2) The vehicle drive device according to (1), in which
  the protection cover is provided with a guiding inclined portion (guiding inclined portion 911) that protrudes from the first protection wall toward the first electric machine and extends in an up-down direction and in the axial direction of the first electric machine.

According to (2), the protection wall is provided with the guiding inclined portion that protrudes from the first protection wall toward the first electric machine and extends in the up-down direction and in the axial direction. Since the first temperature-control medium that is sprinkled from the first electric machine and adheres to the first protection wall above the guiding inclined portion can be supplied back to the first electric machine from the end portion for temperature control for the first electric machine. Accordingly, more efficient temperature control for the first electric machine can be achieved.

(3) The vehicle drive device according to (2), in which
the axial direction of the first electric machine extends horizontally in a first direction (vehicle width direction),
the first electric machine includes:
the substantially annular-shaped first rotor (rotor 21); and
the first stator (stator 22) disposed at a predetermined distance in the radial direction from an outer surface of the first rotor,
the first stator includes: a first stator core (stator core 221); and a first coil (coil 222) that is attached to the first stator core and has a substantially annular shape when viewed in the axial direction of the first electric machine,
the first coil includes a first coil end portion (left end portion 222a) protruding outward in the axial direction of the first electric machine from a first stator core end surface (left end surface 221a) that is an end surface of the first stator core on one side in the axial direction of the first electric machine,
the first electric machine is provided with a coil protection member (coil protection member 24) covering the first coil end portion at least in part in a circumferential direction, and
the guiding inclined portion is formed, when viewed from the first direction, such that an end portion (end portion 911a) of the guiding inclined portion overlaps with an upper end portion (upper end portions 24a) of the coil protection member above the coil protection member in a second direction (front-rear direction) perpendicular to both the up-down direction and the first direction.

According to (3), since the guiding inclined portion is formed, when viewed from the first direction, such that the end portion of the guiding inclined portion overlaps with the upper end portion of the coil protection member above the coil protection member in the second direction, the first temperature-control medium supplied from the end portion of the guiding inclined portion toward the first electric machine is supplied from the upper end portions of the coil protection member to a space surrounded by the coil protection member and the first stator core end surface. Then, the first temperature-control medium supplied to the space flows inside the space along the first coil end portion for temperature control for the first coil end portion. Thus, more efficient temperature control for the first coil end portion can be achieved.

(4) The vehicle drive device according to (1), in which
the second electric machine (generator 30) is accommodated in the electric machine housing,
both the axial direction of the first electric machine and an axial direction of the second electric machine extend horizontally in the first direction (vehicle width direction),
the storage unit (storage unit 75) in which the first temperature-control medium is stored is formed in a lower portion of the electric machine housing,
the second electric machine is disposed below the live part when viewed from the first direction such that the second electric machine overlaps with the live part in a second direction (front-rear direction) perpendicular to both the up-down direction and the first direction at least in part,
the second electric machine is immersed in the first temperature-control medium stored in the storage unit at least in part, and
the protection cover includes a second protection wall (second protection wall 92) extending in the up-down direction and in the second direction to cover one side of the live part in the first direction at least in part.

According to (4), since the protection cover includes the second protection wall extending in the up-down direction and in the second direction to cover one side of the live part in the first direction at least in part, the second protection wall can prevent the first temperature-control medium scooped up from the storage unit by the second electric machine from adhering to the live part. Accordingly, even when the conductive second temperature-control medium enters the non-conductive first temperature-control medium, a short circuit can be prevented from occurring.

(5) The vehicle drive device according to (4), in which
the second protection wall has an opening (opening 921) in the first direction into which a first wiring member (first wiring members 761U, 761V, and 761W) configured to electrically connect the live part and the first electric machine is inserted, and
an opening protection wall (opening protection wall 922) protruding from the second protection wall in a direction away from the live part in the first direction is provided at a lower edge portion (lower edge portion 921a) of the opening.

According to (5), since the opening protection wall protruding from the second protection wall in the direction away from the live part is provided at the lower edge portion, the opening protection wall can prevent the first temperature-control medium that is scooped up by the second electric machine from the storage unit from entering, from the opening, the space in which the live part is disposed. Accordingly, even when the conductive second temperature-control medium enters the non-conductive first temperature-control medium, the first temperature-control medium containing the conductive second temperature-control medium can be prevented from entering from the opening and adhering to the live part, and a short circuit can be prevented from occurring.

The invention claimed is:
1. A vehicle drive device comprising:
a first electric machine;
an electric machine housing accommodating the first electric machine;
a live part that is provided inside the electric machine housing and is electrically connected to the first electric machine; and
a temperature-control circuit for temperature control for the first electric machine, wherein
the temperature-control circuit includes:
a first temperature-control circuit through which a non-conductive first temperature-control medium circulates;
a second temperature-control circuit through which a conductive second temperature-control medium circulates; and
a heat exchanger configured to exchange heat between the first temperature-control medium and the second temperature-control medium,
at least some of the first temperature-control medium passes inside the electric machine housing for the temperature control for the first electric machine,
the first temperature-control circuit includes a dropping pipe that is disposed inside the electric machine housing and above the first electric machine, extends in an axial direction of the first electric machine, and from which the first temperature-control medium drops onto the first electric machine, the live part is provided on a radially outer side of the first electric machine such that the live part overlaps with the first electric machine in the axial direction of the first electric machine, and a protection cover including a first protection wall extending in the axial direction of the first electric machine on the radially outer side of the first electric machine and between the first electric machine and the live part is provided inside the electric machine housing.

2. The vehicle drive device according to claim 1, wherein the protection cover is provided with a guiding inclined portion that protrudes from the first protection wall toward the first electric machine and extends in an up-down direction and in the axial direction of the first electric machine.

3. The vehicle drive device according to claim 2, wherein the axial direction of the first electric machine extends horizontally in a first direction, the first electric machine includes:
 a substantially annular-shaped first rotor; and
 a first stator disposed at a predetermined distance in the radial direction from an outer surface of the first rotor, the first stator includes: a first stator core; and a first coil that is attached to the first stator core and has a substantially annular shape when viewed in the axial direction of the first electric machine, the first coil includes a first coil end portion protruding outward in the axial direction of the first electric machine from a first stator core end surface that is an end surface of the first stator core on one side in the axial direction of the first electric machine, the first electric machine is provided with a coil protection member covering the first coil end portion at least in part in a circumferential direction, and the guiding inclined portion is formed, when viewed from the first direction, such that an end portion of the guiding inclined portion overlaps with an upper end portion of the coil protection member above the coil protection member in a second direction perpendicular to both the up-down direction and the first direction.

4. The vehicle drive device according to claim 3, wherein a second electric machine is accommodated in the electric machine housing, both the axial direction of the first electric machine and an axial direction of the second electric machine extend horizontally in the first direction, a storage unit in which the first temperature-control medium is stored is formed in a lower portion of the electric machine housing, the second electric machine is disposed below the live part when viewed from the first direction such that the second electric machine overlaps with the live part in the second direction at least in part, the second electric machine is immersed in the first temperature-control medium stored in the storage unit at least in part, and the protection cover includes a second protection wall extending in the up-down direction and in the second direction to cover one side of the live part in the first direction at least in part.

5. The vehicle drive device according to claim 2, wherein a second electric machine is accommodated in the electric machine housing, both the axial direction of the first electric machine and an axial direction of the second electric machine extend horizontally in the first direction, a storage unit in which the first temperature-control medium is stored is formed in a lower portion of the electric machine housing, the second electric machine is disposed below the live part when viewed from the first direction such that the second electric machine overlaps with the live part in the second direction at least in part, the second electric machine is immersed in the first temperature-control medium stored in the storage unit at least in part, and the protection cover includes a second protection wall extending in the up-down direction and in the second direction to cover one side of the live part in the first direction at least in part.

6. The vehicle drive device according to claim 1, wherein a second electric machine is accommodated in the electric machine housing, both the axial direction of the first electric machine and an axial direction of the second electric machine extend horizontally in the first direction, a storage unit in which the first temperature-control medium is stored is formed in a lower portion of the electric machine housing, the second electric machine is disposed below the live part when viewed from the first direction such that the second electric machine overlaps with the live part in a second direction perpendicular to both the up-down direction and the first direction at least in part, the second electric machine is immersed in the first temperature-control medium stored in the storage unit at least in part, and the protection cover includes a second protection wall extending in the up-down direction and in the second direction to cover one side of the live part in the first direction at least in part.

7. The vehicle drive device according to claim 6, wherein the second protection wall has an opening in the first direction into which a first wiring member configured to electrically connect the live part and the first electric machine is inserted, and an opening protection wall protruding from the second protection wall in a direction away from the live part in the first direction is provided at a lower edge portion of the opening.

* * * * *